Figure 1:
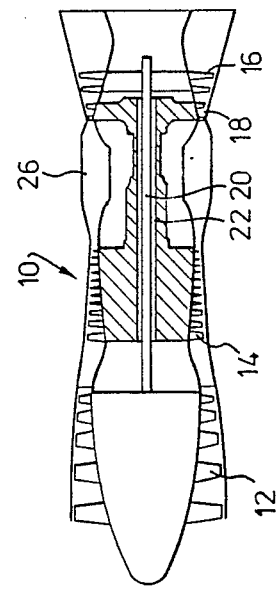

United States Patent [19]

Lyons

[11] Patent Number: 4,711,085
[45] Date of Patent: Dec. 8, 1987

[54] GAS TURBINE ENGINE FUEL SYSTEMS

[75] Inventor: Michael R. Lyons, Leicester, England

[73] Assignee: Rolls-Royce plc, London, England

[21] Appl. No.: 830,138

[22] Filed: Feb. 18, 1986

[30] Foreign Application Priority Data

Apr. 25, 1985 [GB] United Kingdom ............... 8510568

[51] Int. Cl.⁴ ............................................... F02C 7/26
[52] U.S. Cl. .................................... 60/39.141; 60/739
[58] Field of Search ............... 60/739, 740, 742, 746, 60/747, 39.141, 39.821

[56] References Cited

U.S. PATENT DOCUMENTS

| | | | |
|---|---|---|---|
| 3,283,502 | 11/1966 | Lefebvre | 60/739 |
| 3,319,418 | 5/1967 | Bryant et al. | 10/39.141 |
| 3,335,567 | 8/1967 | Hemsworth | 60/739 |
| 3,991,558 | 11/1976 | Schroff | 60/39.141 |
| 4,062,183 | 12/1977 | Davies et al. | 60/739 |
| 4,417,439 | 11/1983 | Sepulveda et al. | 60/39.141 |

Primary Examiner—Louis J. Casaregola
Assistant Examiner—Timothy S. Thorpe
Attorney, Agent, or Firm—Cushman, Darby & Cushman

[57] ABSTRACT

A fuel system for a gas turbine engine is arranged to schedule fuel flow between primary and secondary fuel injectors in order to obtain good ignition and light round when the engine is operating on diesel fuel. The system includes either two solenoid valves in parallel with flow restrictors or a single solenoid operated valve and two flow restrictors. The two valves or the diverter valve schedule the fuel flow so that at engine start up, the flow to the primary and secondary fuel injectors is according to requirement proportioned. At a certain engine speed the flow to the secondary fuel injectors is reduced to purge flow and the major part of the fuel flow passes to the primary fuel injectors.

3 Claims, 6 Drawing Figures

GAS TURBINE ENGINE FUEL SYSTEMS

This invention relates to fuel systems for gas turbine engines.

Many types of gas turbine engines originally designed as aero-engines, are modified as stationary engines to generate electricity, drive pumps, and to provide the motive power for marine vessels. The engines in their original form, as aero-engines are intended to operate on specially refined fuels. In modifying these engines for use in ships, the fuel systems usually have to be altered so that the engines can operate on lower grade fuels, such as diesel fuel. Operating on diesel fuel can create particular problems, such as the tendency for carbon deposits to be built up, and difficulties in obtaining satisfactory starting of the engine. It is to this latter problem that the present invention is addressed.

A satisfactory start is obtained if ignition takes place without excessive amounts of fuel passing through the engine in an unburnt state, known as a "wet-start", and ignition takes place simultaneously, or nearly so in all the combustion chambers, or around the complete combustion chamber, in the case of an annular combustion system, known as "light round".

If a good "light round" is not achieved, then there will be areas in the resulting products of combustion which are at excessively high temperatures. These "hot spots" can easily cause damage to the high pressure turbine blades and nozzle guide vanes of the engine.

The present invention seeks to provide a fuel system for a gas turbine engine, e.g., an engine adapted to operate on diesel fuel, for marine propulsion, in which good "light round" is achieved, and damage to the turbine, due to "hot spots" in the combustion gas, is avoided.

Accordingly, the present invention provides a fuel system for a gas turbine engine, the fuel system including a primary fuel manifold and a secondary fuel manifold a fuel supply line to each of said manifolds via flow restricting means in each manifold and valve means adapted to receive fuel from said fuel supply and to discharge fuel to the primary manifold after the engine has reached a predetermined rotational speed, or the secondary manifold when the engine is being started.

The valve means may comprise a solenoid operated valve and a flow restrictor in parallel with the valve in the fuel supply line to each manifold.

Alternatively, the valve means may comprise a diverter valve which can be solenoid operated, arranged to pass fuel to one or other of the fuel supply lines of the manifolds, downstream of flow restricting means in each of the fuel supply lines.

Figure 2:
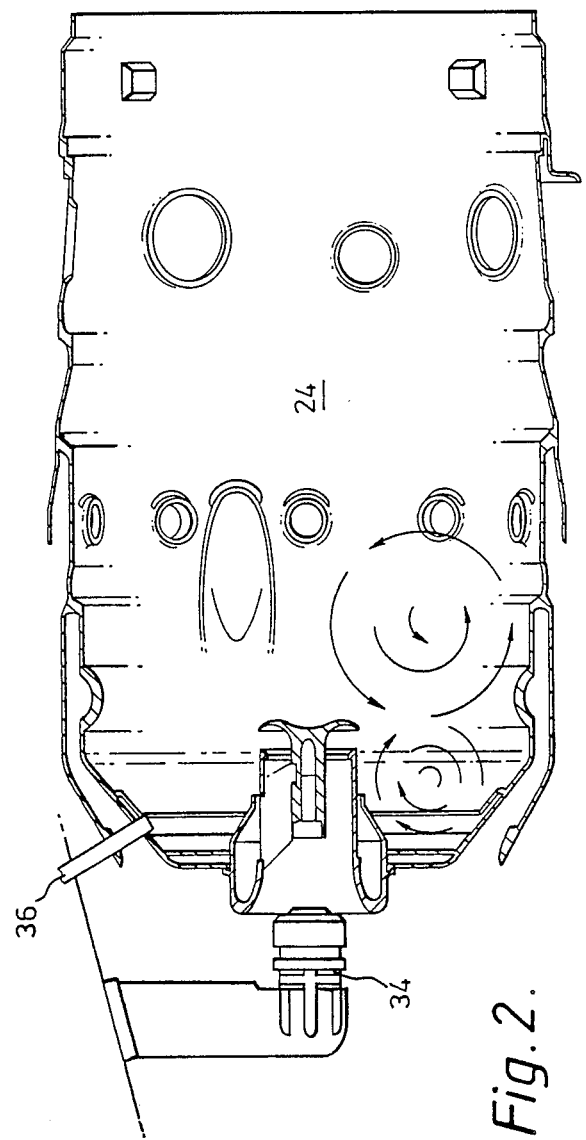
Figure 3:
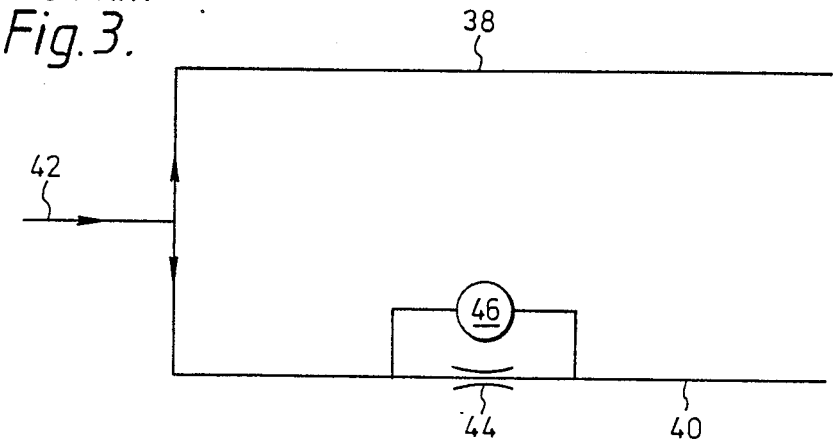

The present invention will now be more particularly described with reference to the accompanying drawings in which, FIG. 1 shows a gas turbine engine in which the present invention can be incorporated, FIG. 2 shows a combustion chamber and associated fuel injectors of the engine shown in FIG. 1, FIG. 3 is a diagrammatic representation of a prior art fuel supply system for the engine shown in FIG. 1.

Figure 4:
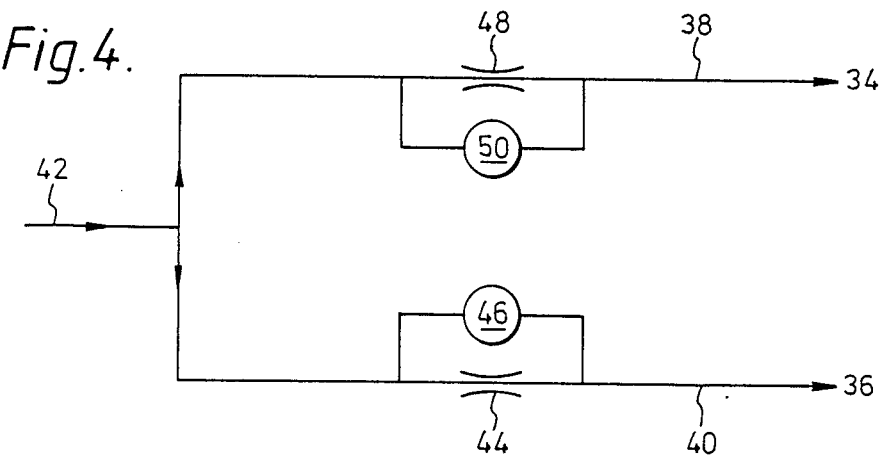
Figure 5:
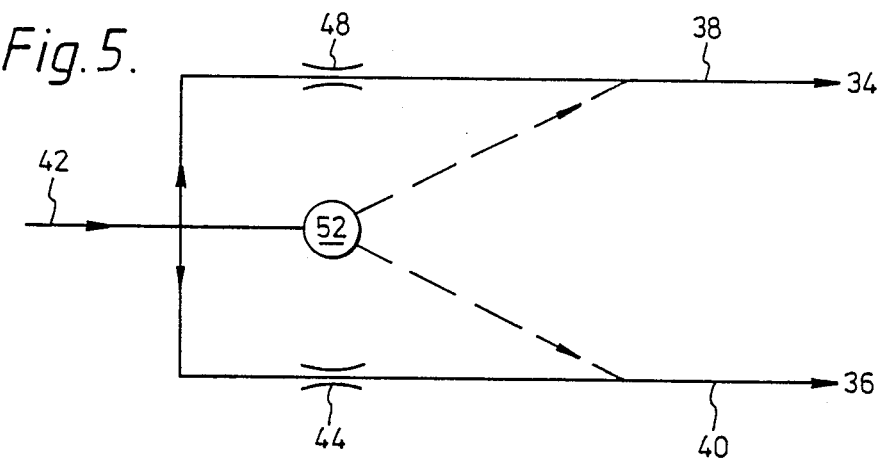
Figure 6:
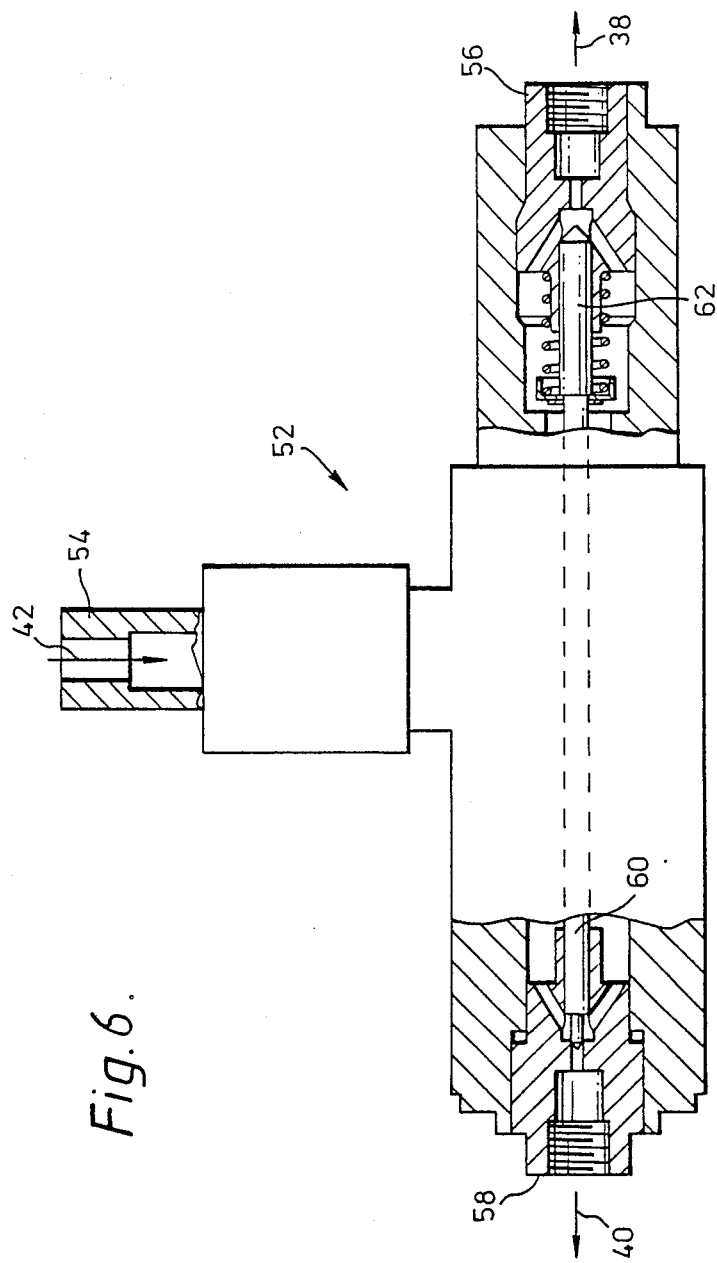

FIG. 4 is a diagrammatic representation of a first embodiment of a fuel supply system according to the present invention, FIG. 5 is a diagrammatic representation of a second embodiment of a fuel supply system according to the present invention, and FIG. 6 shows a diverter valve of the fuel system shown in FIG. 5.

Referring to FIG. 1, a gas turbine engine 10 has low and high pressure compressors 12, 14 driven by low and high pressure turbines 16, 18 through shafts 20, 22. A combustion system comprising a number of equi-spaced cans, 24, in an annular housing 26 receives compressed air from the compressor 14 and liquid fuel, and the products of combustion are discharged through nozzles 28 to drive the turbines. Though, not shown the discharge from the engine is used to drive a power turbine which in turn drives a propellor or propellors of a marine vessel via a speed reducing gear box.

Referring to FIGS. 2 and 3, each combustion can 24 has a primary fuel injector 34 and a secondary fuel injector 36. The primary and secondary fuel injectors are all connected to respective primary and secondary fuel manifolds, (not shown) and each manifold has fuel supply line 38, 40, supplied with liquid fuel from a line 42.

Referring more particularly to FIG. 3, the supply line to the primary manifold has no valves or restrictors, but the supply line to the secondary manifold has a flow restrictor 44 and a solenoid operated valve 46 in parallel to the restrictor 44. At engine starting, the solenoid valve 46 is open, and a proportion e.g., ⅓ of the fuel flow from the supply line 42 flows to the secondary manifold and hence to the secondary fuel injectors while a greater proportion e.g., ⅔'s of the fuel flow passes to the primary manifold and hence the primary fuel burner. Once the engine reaches a predetermined speed, the solenoid valve is closed, and only a small purging flow of fuel passes to the secondary fuel injectors via the restrictor 44. The majority of the fuel e.g., 95% passes to the primary fuel injectors. It has been found that when the engine operates on diesel fuel, or fuel of similar quality, poor ignition and light round is obtained. Light round is the ability of ignition in one combustion can being able to be transmitted to adjacent cans via interconnecting ducts.

Referring to FIG. 4, the invention proposes that a flow restrictor 48, and parallel solenoid valve 50 are also located in the supply line to the primary manifold. In this arrangement, at engine start up, the solenoid valve 46 is open whilst the solenoid valve 50 is shut, so that the flow to the primary manifold passes through the restrictor 48. This has the effect of balancing the fuel flows so that approximately equal flows of fuel pass to the primary and secondary fuel injectors via the respective manifolds. The increased fuel supply to the secondary fuel injectors increases the fuel pressure in the secondary fuel injectors 36 and improves fuel atomisation. This system improves ignition and light round substantially and reduces considerably peak turbine temperatures.

Above a predetermined engine speed, the valve 46 is closed, and the valve 50 is opened, so that the fuel flow to the fuel injectors 34 flows through the valve 50, and the secondary fuel injectors only receive a small purging flow through the restrictor 44.

The twin solenoids, 46, 50 can be replaced by a single solenoid operated diverter valve 52, as shown in FIG. 5, thereby avoiding the complication of controlling two solenoid valves.

The valve 52 has an inlet 54 (FIG. 6) which receives fuel from the line 42, and two outlets 56, 58 which deliver fuel to the supply lines 38, 40 respectively. The valve has a two part plunger 60, 62, the part 62 being sprung loaded in the sense of keeping the outlet 56 open. Operation of the solenoid (not shown) of the valve will cause the plunger 60 to move to the right against the sprung load of the plunger part 62, and the plunger part 62 will close off the outlet 56. When the solenoid is de-energised the plunger part 60 moves to the left to close off the outlet 58, and the plunger part 62 also moves to the left under the influence of the spring opening the outlet 56.

In operation, at engine start up, the solenoid valve is energised, thus closing off the outlet 56 and opening the outlet 58. The fuel flows to the primary fuel injectors 34 through the restrictor 48 in line 38, and to the secondary fuel injectors 36 through the diverter valve 52, by-passing the restrictor 44 in line 40. The fuel flow split is again approximately 50% to the primary fuel injectors and 50% to the secondary fuel injectors. When the engine has started and a predetermined speed is reached, the valve 52 is de-energised, closing off the outlet 58 to the secondary fuel injectors, and opening the outlet 56 to the primary fuel injectors.

Fuel systems in accordance with the present invention provide a relatively simple and reliable means of scheduling fuel flow between burners in response to an electrical signal.

The fuel flow along supply lines 38, 40 can be proportioned according to needs, by varying the sizes of either or both of the restrictors 44, 48.

I claim:

1. A fuel system for a gas turbine engine comprising:
   at least one primary fuel injector;
   at least one secondary fuel injector;
   a primary fuel supply line operatively connected to said at least one primary fuel injector;
   a secondary fuel supply line operatively connected to said secondary fuel injector;
   means for supplying fuel to said primary fuel supply line and to said secondary fuel supply line;
   fuel flow restricting means in each of said primary and said secondary fuel supply lines; and
   valve means operatively connected to said fuel supply means and to said primary and secondary fuel supply lines downstream of said fuel flow restricting means in each, said valve means comprising a solenoid valve arranged in parallel with said flow restricting means in each of said primary and secondary fuel supply lines where said valve means is selectively operable to direct fuel to bypass said fuel flow restricting means in one of said primary and secondary fuel lines.

2. A fuel system as claimed in claim 1 in which said flow restricting means in said primary fuel supply line is confined when said valve means is operated to direct a supply of fuel to said secondary fuel supply line such that fuel flows to each of said at least one primary fuel injector and said at least one secondary fuel injector are substantially the same.

3. A fuel system as claimed in claim 1 in which said valve means is a diverter valve arranged to receive fuel from said fuel supply means and to discharge fuel to one of said primary and secondary fuel supply lines downstream of said flow restricting means therein.

* * * * *